(12) United States Patent
Carlson et al.

(10) Patent No.: US 9,238,774 B2
(45) Date of Patent: Jan. 19, 2016

(54) SOIL FIXATION, DUST SUPPRESSION AND WATER RETENTION

(71) Applicant: Empire Technology Development LLC, Wilmington, DE (US)

(72) Inventors: William Brenden Carlson, Seattle, WA (US); Gregory D. Phelan, Cortland, NY (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 79 days.

(21) Appl. No.: 13/940,024

(22) Filed: Jul. 11, 2013

(65) Prior Publication Data

US 2014/0126966 A1    May 8, 2014

(30) Foreign Application Priority Data

Nov. 2, 2012    (WO) .................. PCT/US2012/06324

(51) Int. Cl.
| | |
|---|---|
| C09K 17/00 | (2006.01) |
| E02D 3/12 | (2006.01) |
| C09K 17/16 | (2006.01) |
| C09K 17/18 | (2006.01) |

(52) U.S. Cl.
CPC ................. *C09K 17/16* (2013.01); *C09K 17/18* (2013.01)

(58) Field of Classification Search
CPC ....................................................... C09K 17/16
USPC ......................................................... 523/132
See application file for complete search history.

(56) References Cited

U.S. PATENT DOCUMENTS

| | | |
|---|---|---|
| 3,153,593 A | 10/1964 | De Pauw |
| 3,542,908 A | 11/1970 | Sharples et al. |
| 4,156,777 A | 5/1979 | Kimura |
| 4,323,487 A | 4/1982 | Jones et al. |
| 4,476,593 A | 10/1984 | Fanselow et al. |
| 4,587,331 A | 5/1986 | Hlavka et al. |
| 4,601,757 A | 7/1986 | Brown et al. |
| 4,771,105 A | 9/1988 | Shirai et al. |
| 4,822,848 A | 4/1989 | Ito et al. |
| 4,865,640 A | 9/1989 | Avera |
| 4,996,059 A | 2/1991 | Grollier et al. |
| 5,002,680 A | 3/1991 | Schmidt et al. |
| 5,045,617 A | 9/1991 | Shih et al. |
| 5,232,688 A | 8/1993 | Ziegler et al. |
| 5,294,435 A | 3/1994 | Remz et al. |

(Continued)

FOREIGN PATENT DOCUMENTS

| | | |
|---|---|---|
| BE | 603491 | 5/1961 |
| CN | 101438701 | 5/2009 |

(Continued)

OTHER PUBLICATIONS

Badey et al., "Radically initiated polymerization of a methacryloylamido-terminated saccharide, 1, Monomer synthesis, homopolymerization and characterizations", Macromolecular Chemistry and Physics, 1996, vol. 197, p. 3711-3728.*

(Continued)

*Primary Examiner* — David Karst
(74) *Attorney, Agent, or Firm* — Foley & Lardner LLP

(57) ABSTRACT

A method for at least temporarily retaining moisture in a soil-based substrate includes applying an acrylamide pyranose polymer to the soil-based substrate.

18 Claims, 2 Drawing Sheets

(56) References Cited

U.S. PATENT DOCUMENTS

| | | | |
|---|---|---|---|
| 5,474,768 A | 12/1995 | Robinson | |
| 5,609,862 A | 3/1997 | Chen et al. | |
| 5,646,100 A | 7/1997 | Haugk et al. | |
| 5,698,052 A | 12/1997 | Russo et al. | |
| 5,965,147 A | 10/1999 | Steffier | |
| 5,993,857 A | 11/1999 | Menzel et al. | |
| 6,133,212 A | 10/2000 | Elliott et al. | |
| 6,277,892 B1 | 8/2001 | Deckner et al. | |
| 6,410,668 B1 | 6/2002 | Chiari | |
| 6,488,091 B1 | 12/2002 | Weaver et al. | |
| 6,488,901 B1 | 12/2002 | Schmidt et al. | |
| 6,552,103 B1 | 4/2003 | Bertozzi et al. | |
| 6,613,378 B1 | 9/2003 | Erhan et al. | |
| 6,664,356 B1 | 12/2003 | Shih | |
| 6,875,426 B2 | 4/2005 | Candau | |
| 7,422,735 B1 | 9/2008 | Hossel et al. | |
| 7,423,090 B2 | 9/2008 | Doane et al. | |
| 7,455,848 B2 | 11/2008 | Hessefort et al. | |
| 7,541,414 B2 | 6/2009 | Lion | |
| 7,560,428 B2 | 7/2009 | Hirai et al. | |
| 7,597,879 B2 | 10/2009 | Gupta | |
| 7,601,340 B2 | 10/2009 | Nojiri et al. | |
| 7,671,007 B2 | 3/2010 | Carnali et al. | |
| 7,754,192 B2 | 7/2010 | Wood et al. | |
| 7,763,240 B2 | 7/2010 | Anderson et al. | |
| 7,777,073 B2 | 8/2010 | Gupta | |
| 7,780,954 B2 | 8/2010 | Polonka et al. | |
| 7,785,575 B2 | 8/2010 | Anderson et al. | |
| 7,794,839 B2 | 9/2010 | Schmidt et al. | |
| 7,875,264 B2 | 1/2011 | Takakura et al. | |
| 8,017,553 B2 | 9/2011 | Doane et al. | |
| 8,316,580 B2 | 11/2012 | Krysiak et al. | |
| 2002/0111281 A1 | 8/2002 | Vishnupad | |
| 2002/0128346 A1 | 9/2002 | Domschke et al. | |
| 2002/0150688 A1 | 10/2002 | Knight et al. | |
| 2006/0035341 A1 | 2/2006 | Boeckh et al. | |
| 2006/0113080 A1 | 6/2006 | Nguyen et al. | |
| 2007/0031366 A1 | 2/2007 | Meyers et al. | |
| 2007/0107638 A1 | 5/2007 | Chun et al. | |
| 2008/0057206 A1 | 3/2008 | Igo et al. | |
| 2008/0066509 A1 | 3/2008 | Turley | |
| 2008/0281064 A1 | 11/2008 | Chiron et al. | |
| 2009/0026338 A1 | 1/2009 | Bruce | |
| 2009/0074823 A1 | 3/2009 | Takakura | |
| 2009/0137771 A1 | 5/2009 | Moriyama et al. | |
| 2009/0263338 A1 | 10/2009 | Rolland et al. | |
| 2009/0297466 A1 | 12/2009 | Gutmann et al. | |
| 2010/0003236 A1 | 1/2010 | Dalko et al. | |
| 2010/0028284 A1 | 2/2010 | Atis et al. | |
| 2010/0028285 A1 | 2/2010 | Frampton et al. | |
| 2010/0074855 A1 | 3/2010 | Tanaka et al. | |
| 2010/0090160 A1 | 4/2010 | Branning | |
| 2010/0093535 A1 | 4/2010 | Rose et al. | |
| 2010/0218781 A1 | 9/2010 | McNamara et al. | |
| 2010/0275664 A1* | 11/2010 | Windhoevel | 71/27 |
| 2010/0291055 A1 | 11/2010 | Athanasiadis et al. | |
| 2011/0028607 A1 | 2/2011 | Morgan et al. | |
| 2011/0275577 A1 | 11/2011 | Priebe et al. | |
| 2011/0282048 A1 | 11/2011 | Brumer et al. | |
| 2012/0220454 A1 | 8/2012 | Chen et al. | |
| 2012/0277099 A1 | 11/2012 | Olson et al. | |
| 2014/0178344 A1 | 6/2014 | Carlson et al. | |

FOREIGN PATENT DOCUMENTS

| | | |
|---|---|---|
| CN | 102511480 | 6/2012 |
| CN | 101723765 | 11/2012 |
| CZ | 278551 | 1/1994 |
| CZ | 8500097 | 1/1994 |
| DE | 11 54 815 | 9/1963 |
| DE | 28 05 185 | 7/1978 |
| EP | 0 186 085 | 7/1986 |
| EP | 0 608 353 | 8/1994 |
| EP | 1 516 612 | 3/2005 |
| EP | 1 704 769 | 9/2006 |
| EP | 1 820 490 | 8/2007 |
| GB | 0 935 290 | 8/1963 |
| GB | 1 099 372 | 1/1968 |
| JP | S57202309 | 12/1982 |
| JP | 63-280001 | 11/1988 |
| JP | 2009-175875 | 7/1997 |
| JP | 2007-206166 | 8/2007 |
| JP | 05-056707 | 10/2012 |
| WO | WO-91/05459 | 5/1991 |
| WO | WO-93/07856 | 4/1993 |
| WO | WO-99/64563 | 12/1999 |
| WO | WO-2004/028686 | 4/2004 |
| WO | WO-2008/132340 | 11/2008 |
| WO | WO-2012/022164 | 2/2012 |

OTHER PUBLICATIONS

Badey et al., "Radically initiated polymerization of a methacryloylamido-terminated saccharide, 2, Copolymerization with 2-hydroxyethyl methacrylate", Macromolecular Chemistry and Physics, 1997, vol. 198, p. 945-957.*

"Cognis," accessed at https://web.archive.org/web/20120502131818/http://www.cognis.com/company/, accessed on Sep. 10, 2014, page 1.

FDA "Part 872—Dental Devices, Subpart D—Prosthetic Devices, Sec. 872.3480 Polyacrylamide polymer (modified cationic) denture adhesive" Code of Federal Regulations, Title 21, vol. 8, accessed at https://web.archive.org/web/20100226140355/http://www.accessdata.fda.gov/scripts/cdrh/cfdocs/cfcfr/CFRSearch.cfm?fr=872.3480&SearchTerm=polyacrylamide, Apr. 1, 2009, page 1.

FDA "Part 172—Food Additives Permitted for Direct Addition to Food for Human Consumption—Subpart C—Coatings, Films and Related Substances, Sec. 172.255 Polyacrylamide," Code of Federal Regulations, Tital 21, vol. 8, accessed at https://web.archive.org/web/20100226140038/http://www.accessdata.fda.gov/scripts/cdrh/cfdocs/cfcfr/CFRSearch.cfm?fr=172.255&SearchTerm=polyacrylamide, Apr. 1, 2009, page 1.

European Commission "Opinion of the Scientific Committee on Cosmetic Products and Non-Food Products intended for Consumers concerning Acrylamide Residues in Cosmetics adopted by the plenary session of the SCCNFP of Sep. 30, 1999," accessed at https://web.archive.org/web/20120927233056/http://ec.europa.eu/health/scientific_committees/consumer_safety/opinions/sccnfp_opinions_97_04/sccp_out95_en.htm, accessed on Sep. 10, 2014, 2 pages.

Bird, T.P., et al., "Preparation and derivatives of poly-(6-O-methacryloyl-D-galactose) and poly-(6-O-acryloyl-D-galactose)," Journal of the Chemical Society (C), vol. 21, 1966, pp. 1913-1918.

Bird, T.P., et al, "Polyamides Containing Carbohydrate Residues," Journal of the Chemical Society, 1963, pp. 3389-3391.

Black, W. A. P., et al., "6-O-Methacryloyl-D-galactose: a reactive, water-soluble monomer," Die Makromolekulare Chemie, vol. 117, No. 2817, 1968, pp. 210-214.

Bock, K., et al, "Amino Acids and Amino Sugars from Bromodeoxyaldonolactones," Organic Chemistry and Biochemistry, B, vol. 41, 1987, pp. 435-441.

Bokhari, M., et al., "Emulsion-templated porous polymers as scaffolds for three dimensional cell culture: effect of synthesis parameters on scaffold formation and homogeneity," J. Mater. Chem., vol. 17, 2007, pp. 4088-4094.

Botto, R. E., et al, "Nitrogen-15 Nuclear Magnetic Resonance Spectroscopy of Neomycin B and Related Aminoglycosides," Journal of the American Chemical Society, vol. 105, No. 4, 1983, pp. 1021-1028.

Brendel, K. et al., "Amino sugar synthesis. XVI. 2-Amino-2,6-dideoxy-D-allose and 2-amino-2,6-dideoxy-D-glucose," Justus Liebigs Annalen der Chemie, vol. 691, 1966, pp. 192-197. (English translation not available).

Brendel, K. et al., "Amino sugar synthesis. XIII. Mechanism of nucleophilic replacement of methanesulfonyl groups—simultaneous formation of D-gulosamine and D-galactosamine derivatives from D-glucosamine derivatives," Justus Liebigs Annalen der Chemie, vol. 683, 1965, pp. 182-186. (English translation not available).

(56) References Cited

OTHER PUBLICATIONS

Brendel, K. et al., "Preparation of 2,6-diamino-2,6-dideoxy-D-arabino-hexose. An improved preparation of benzyl 3,4-di-O-acetyl-2-[(benzyloxycarbonyl)amino] -2-deoxy-3B1-D 013 glucurononitrile," Chemische Berichte, vol. 97, No. 5, 1964, pp. 1513. (English translation not available).

Brimacombe, J.S., et al, "A convenient synthesis of 2,6-diamino-2,6-dideoxy-D-gulose," Carbohydrate Research, vol. 25, No. 2, 1972, pp. 522-525.

Cameron, N. R., "High internal phase emulsion templating as a route to well-defined porous polymers," Polymer, vol. 46, Issue 5, Feb. 14, 2005, pp. 1439-1449.

Chen, S. et al., "Synthesis of melamine-glucose resin adhesive," Science in China Series B: Chemistry, vol. 48, 2005, pp. 29-32.

Christiansen, A.W. et al., "Potential of carbohydrates for exterior-type adhesives," Forrest Products Journal, vol. 36, No. 7/8, Jul./Aug. 1986, pp. 20-28.

Collins, P.M., et al, "The Synthesis of Amino-sugars from Glycopyranosiduloses," Journal of the Chemical Society, 1965, pp. 3448-3456.

Dorn, H. et al., "Potential cytostats. V," Monatsberichte der Deutschen Akademie der Wissenschaften zu Berlin, vol. 6, No. 6, 1964, pp. 447-454. (English translation not available).

Dos Santos, L.A., et al, "Dual-Setting Calcium Phosphate Cement Modified with Ammonium Polyacrylate," Artificial Organs, vol. 27, No. 5, 2003, pp. 412-418.

Dyer, J.R., et al, "Streptomycin. II. Streptose," Journal of the American Chemical Society, vol. 87, No. 3, 1965, pp. 654-655.

Fanta, G.F. et al., "Graft Polymerization of Acrylamide and 2-Acrylamido-2-methylpropanesulfonic Acid," Journal of Applied Polymer Science, vol. 24, Issue 9, Nov. 1, 1979, pp. 2015-2023.

Fatiadi, A.J., et al, "Cyclic Polyhydroxy Ketones II. xylo-Trihydroxycyclohexenediolic Acid and KetoInositols," Journal of Research of the National Bureau of Standards, Section A: Physics and Chemistry, vol. 68A, No. 3, May-Jun. 1964, pp. 287-299.

Final Office Action received for U.S. App. No. 13/879,976 dated Oct. 23, 2014, 15 pages.

Goda, S.K. et al., "Neomycin biosynthesis: the incorporation of D-6-deoxyglucose derivatives and variously labeled glucose into the 2-deoxystreptamine ring: postulated involvement of 2-deoxyinosose synthase in the biosynthesis," The Journal of Antibiotics, vol. 45, No. 6, Jun. 1992, pp. 984-994.

Granville, A. M., et al, "Chemo-enzymatic Synthesis and RAFT Polymerization of 6-O-Methacryloyl Mannose: A Suitable Glycopolymer for Binding to the Tetrameric Lectin Concanavalin A?," Macromol. Symp., vol. 255, 2007, pp. 81-89.

Gross, P.H. , et al., "2,6-Diamino-2,6-dideoxy-D-mannose and D-rhamnosamine from D-glucosamine," Justus Liebigs Annalen der Chemie, vol. 683, 1965, pp. 179-182. (English translation not available).

Gross, P.H. et al., "2,6-Diamino-2,6-dideoxy-D-allose from glucosamine by use of an inversion with thionyl chloride," Die Naturwissenschaften, vol. 51, No. 21, 1964, pp. 509-510. (English translation not available).

Gross, P.H. et al., "Amino sugar syntheses. IX. Synthesis of 2,6-diamino-2,6-dideoxy-D-gulose by using an oxazolidone protective group," Justus Liebigs Annalen der Chemie, vol. 681, 1965, pp. 225-227. (English translation not available).

Gross, P.H. et al., "New oxazolidone synthesis and preparation of 2,6-diamino-2,6-dideoxy-D-gulose," Angewandte Chemie, vol. 76, No. 9, 1964, pp. 377. (English translation not available).

Gross, P.H., et al., "Amino sugar synthesis. XII. 2,6-Diamino-2,6-dideoxy-D-allose," Naturwissenschaften, vol. 52, No. 8, 1965, pp. 185.

Gross, P.H., et al., "Amino sugar synthesis. XVII. Synthesis of D-rhamnosamine and of 2,6-diamino2,6-dideoxy-D-mannose from N-acetyl-D-mannosamine," Justus Liebigs Annalen der Chemie, vol. 691, 1966, pp. 198-204. (English translation not available).

Haskell, T.H., et al, "Paromomycin. I. Parmamine, a glycoside of D-glucosamine," Journal of the American Chemical Society, vol. 81, 1959, pp. 3480-3481.

Haskell, T. H., et al, "Paromomycin II. Paromobiosamine, A Diaminohexosyl-D-Ribose," Journal of the American Chemical Society, vol. 81, Jul. 5, 1959, pp. 3481.

Haskell, T. H., et al, "The Configuration of Paromose," Journal of Organic Chemistry, vol. 28, No. 10, Oct. 1963, pp. 2598-2604.

Hill, T. G. et al., "Carbohydrate Protein Conjugates (CPC): The Design of New Materials to Stabilize Enzymes," Mat. Res. Symp. Proc., vol. 218, 1991, pp. 7-15.

Horii, S., et al. "Separation of zygomycin A1 and zygomycin A2 and their degradation products," Takeda Kenkyusho Nenpo, vol. 23, 1964, pp. 8-17.

Huettenrauch, R. et al., "Detection of the primary cleavage products of paromomycin," Pharmazeutische Zentralhalle fuer Deutschland, vol. 104, No. 2, 1965, pp. 85-87. (English translation not available).

International Search Report and Written Opinion for PCT/US12/63211, mailed on Mar. 15, 2013.

International Search Report and Written Opinion for PCT/US2012/063261, mailed on Jan. 22, 2013.

International Search Report and Written Opinion received for PCT/US12/67765 dated Feb. 26, 2013.

International Search Report and Written Opinion received for PCT/US2012/067782 mailed Feb. 5, 2013.

Ivirico, J. L., et al., "Proliferation and differentiation of goat bone marrow stromal cells in 3D scaffolds with tunable hydrophilicity," Journal of Biomedical Materials Research, Part B: Applied Biomaterials, vol. 91, No. 1, 2009, pp. 277-286.

Kadokawa, J. et al., "Synthesis of new aminopolysaccharides by polymerization of 6-amino-6-deoxy-D-glucose and 2,6-diamino-2,6-dideoxy-D-glucose," European Polymer Journal, vol. 36, No. 2, Feb. 2000, pp. 225-230.

Kakinuma, K. et al., "Mechanism and stereochemistry of the biosynthesis of 2-deoxystreptamine and neosamine C," The Journal of Antibiotics, vol. 42, No. 6, Jun. 1989, pp. 926-933.

Kakinuma, K. et al., "Stereochemistry of ribostamycin biosynthesis studied by deuterium NMR spectroscopy," J. Am. Chem. Soc., vol. 103, No. 18, 1981, pp. 5614-5616.

Kakinuma, K. et al., "Transamination stereochemistry in the formation of neosamine C of ribostamycin," Journal of Antibiotics, vol. 36, No. 6, 1983, pp. 749-750.

Kakinuma, K., et al, "Stereochemistry of ribostamycin biosynthesis studied by deuterium NMR spectroscopy," Tennen Yuki Kagobutsu Toronkai Koen Yoshishu, vol. 24,1981, pp. 537-544. (English translation not available)

Kim, S., et al., "Design of new biomimetic glycopolymers for hepatocellular engineering," Proceedings of the International Symposium on Controlled Release of Bioactive Materials, 27th, 2000, pp. 638-639.

Komor, E. et al., "Sugar specificity and sugar-proton interaction for the hexose-proton-symport system of Chlorella," European Journal of Biochemistry, vol. 146, 1985, pp. 649-656.

Konishi, M. et al., "Aminoglycoside antibiotics. VI. Structure determination of 4'-deoxybutirosins (Bu-1975C1 and C2)," The Journal of Antibiotics, vol. 27, No. 6, Jun. 1974, pp. 471-483.

Koster, H. et al., "Physiology and biochemistry of streptomycetes. XI. Different incorporation of D-glucose-u-14C into the paromomycin isomers and the precursors of paromomycin I," Zeitschrift fuer Allgemeine Mikrobiologie, vol. 17, No. 6, 1977, pp. 433-436. (English abstract only).

Krul, L.P. et al., "Water-Soluble Polymers of Acrylamide as Labeling Adhesives," Russian Journal of applied Chemistry, vol. 78, No. 5, 2005, pp. 856-859.

Kurita, K. et al., "Synthetic polymers containing sugar residues, 8. Novel polyureas from 2,6-diamino-2,6-dideoxy-d-gulose and diisocyanates," Die Makromolekylare Chemie, vol. 187, No. 6, Jun. 1986, pp. 1359-1365.

Kuzyaeva, V.A., "Degradation products of colimycin, mycerin, and neomycin," Antibiotiki (Moscow), vol. 9, No. 9, 1964, pp. 784-788. (English translation not available).

Liebermann, B. et al., "Physiology and biochemistry of Streptomycetes. 12. Different uptake and utilization of radioactive-

(56) References Cited

OTHER PUBLICATIONS labeled dendrolites of paromomycin by Streptomyces albus var. metamycinus novus var," Pharmazie, vol. 32, May 1977, pp. 293-295. (English translation not available).

Lodhi, S., et al, "Interactions of Neomycin and Calcium in Synaptosomal Membranes and Polyphosphoinositide Monolayers," Biochimica et Biophysica Acta, vol. 426, 1976, pp. 781-785.

Ludowieg, J.J., et al, "A Method for Analysis of Amino Sugars: Specificity and Mechanism of the Reaction," Carbohydrate Research, vol. 8, 1968, pp. 185-192.

Meyer Zu Reckendorf, W. et al., "Di-und polyaminozucker, XIX N-(2.4-dinitrophenyl)-derivate von diamino-didesoxy-hexosen," Tetrahedron Letters, vol. 13, No. 33, 1972, pp. 3461-3464. (No English translation available).

Meyer Zu Reckendorf, W. et al., "Di-und Polyaminozucker, XVIII Synthesen der 2.4-Diamino-2.4-didesoxy-D-galaktose und-D-glucose," Chemische Berichte, vol. 105, 1972, pp. 2998-3014. (No English translation available).

Meyer Zu Reckendorf, W. et al., "Diamino sugars. VII. New syntheses of 2,6-diamino-2,6-dideoxy-D-allose," Chemische Berichte, vol. 101, No. 7, 1968, pp. 2289-2293. (No English translation available).

Meyer Zu Reckendorf, W., "Diamino sugars. I. A simple synthesis of 2,6-diamino-2,6-dideoxy-3B2-D-glucose," Chemische Berichte, vol. 96, 1963, pp. 2017-2018. (No English translation available).

Meyer Zu Reckendorf, W., "Diamino sugars. II. Synthesis of 2,6-diamino-2,6-dideoxy-D-galactose," Chemische Berichte, vol. 96, No. 8, 1963, pp. 2019-2023. (No English translation available).

Meyer Zu Reckendorf, W., "Diamino sugars. V. Synthesis of 2,3-diamino-2,3-dideoxy-D-allose, 2,3-diamino-2,3-dideoxy-3B1-D-glucose, and 2,6-diamino-2,6-dideoxy-3B1-D-allose," Chemische Berichte, vol. 97, No. 5, 1964, pp. 1275-1285. (No English translation available).

Meyer Zu Reckendorf, W., "Synthesis of 2,6-diamino-2,5-dideoxy-3B2-D-mannose. A derivative of 2,6-imino-2,6-dideoxy-3B1-D-altrose," Chemische Berichte, vol. 98, No. 1, 1965, pp. 93-97. (No English translation available).

Meyer Zu Reckendorf, W., "Synthesis of 2,6-diamino-2,6-dideoxy-L-idose," Angewandte Chemie, vol. 75, 1963, pp. 573. (No English translation available).

Meyer Zu Reckendorf, W., "2,6-Diamino-2,6-dideoxy-β-D-mannose. From methyl 2-benzamido-4,6-O-benzylidene-2-deoxy-3B1-Daltropyranoside by inversion at C-3 via neighboring group participation," Methods in Carbohydrate Chemistry, vol. 6, 1972, pp. 274-276.

Meyer Zu Reckendorf, W., "Diaminosugars—IV. The Synthesis of 2,6-diamino-2,6-Dideoxy-LIdose," Tetrahedron, vol. 19, 1963, pp. 2033-2038.

Meyer Zu Reckendorf, W., "2,6-Diamino-2,6-dideoxy-α-D-galactose. From methyl 2,6-bis(benzamido)-2,6-dideoxy-3-O-methyl-4-Omethylsulfonyl-3B2-D-glucopyranoside by inversion at C-4 via neighboring group participation," Methods in Carbohydrate Chemistry, vol. 6, 1972, pp. 270-273.

Meyer Zu Reckendorf, W., et al, "A large-scale synthesis of 2,6-diamino-2,6-dideoxy-D-glucose," Carbohydrate Research, vol. 45, No. 1, 1975, pp. 307-311.

Miyake, A., "Zygomycins, antibiotic substances produced by Streptomyces pulveraceus," Takeda Kenkyusho Nenpo, vol. 23, 1964, pp. 209-236.

Moitessier, N., et al., "Orthogonally protected carbohydrate-based scaffolds," Tetrahedron Letters, vol. 46, Issue 37, Sep. 12, 2005, pp. 6191-6194.

Morris, James C., et al, "Role of 2,6-Dideoxy-2,6-diaminoglucose in Activation of a Eukaryotic Phospholipase C by Aminoglycoside Antibiotics," The Journal of Biological Chemistry, vol. 272, No. 47, Nov. 21, 1997, pp. 29554-29559.

Moshfeghian, A., et al., "Characterization of emulsified chitosan-PLGA matrixes formed using controlled-rate freezing and lyophilization technique," Journal of Biomedical Materials Research, Part A, vol. 79, No. 2, 2006, pp. 418-430.

Nakanishi, G. et al., "Thermosetting Adhesive Based on Tannin and Poly(NHydroxymethyl Acrylamide," The Journal of Adhesion, vol. 84, No. 7, 2008, pp. 638-652.

Narayani, R., et al., "Collagen-poly (HEMA) hydrogels for the controlled delivery of methotrexate and cisplatin," International Journal of Pharmaceutics, vol. 138, 1996, pp. 121-124.

Non-final Office Action received for U.S. Appl. No. 13/879,976 dated Jul. 8, 2014, 12 pages.

Ogawa, S., et al, "Chemistry of the Neomycins. XIII. Synthesis of Aminocyclitols and Amino Sugars via Nitromethane Condensations," Journal of Organic Chemistry, vol. 39, No. 6, 1974, pp. 812-821.

Ohnsmann, J., "Selective deblockable 2,6-diamino-2,6-didesoxy-D-glucose-Scaffolds for the combinatorial synthesis of potential RNA ligands," Dissertation, German, 2006.

Onodera, K., et al, "The Amadori Rearrangement Product as an Intermediate in the Browning Reaction—Part I. Preparation and Infrared Spectra of 1-Amino-1-deoxy-D-fructoses and 1-Glycino-1-deoxy-D-tagatose," Bull. Agr. Chem. Soc. Japan, vol. 24, No. 7, 1960, pp. 703-710.

Paterson, et al., "Carbohydrate-Based Crosslinking Agents: Potential Use in Hydrogels," Journal of Polymer Science Part A: Polymer Chemistry 2011, vol. 49, pp. 4312-4315.

Petrie, E. M., "Biodegradable Polymers in Adhesive Systems," ASI, accessed at https://web.archive.org/web/20120822220909/http://www.adhesivesmag.com/articles/print/biodegradable-polymers-in-adhesive-systems, Jun. 1, 2007, pp. 6.

Rai, U.S., et al, "Effect of polyacrylamide on the different properties of cement and mortar," Materials Science and Engineering A, vol. 392, 2005, pp. 42-50.

Rinehart, K. L., et al, "Biogenesis of the neomycins," Antimicrobial Agents and Chemotherapy 1961-1970, 1962, 1961, pp. 268-273.

Rinehart, K.L., et al, "Chemistry of the Neomycins. V. Differentiation of the Neomycin Complex. Identity of Framycetin and Neomycin B. Compounds Obtained from Methyl Neobiosaminide B," Journal of the American Chemical Society, vol. 82, 1960, pp. 3938-3946.

Rinehart, K.L., et al, "Chemistry of the Neomycins. VII. Compounds Obtained from Methyl Neobiosaminide C," Journal of the American Chemical Society, vol. 83, Feb. 5, 1961, pp. 643-648.

Rinehart, K.L., et al, "Identity of Neosamine C, "Diaminohexose II" From Zygomycin A, and 2,6-Diamino-2,6-Dideoxy-D-Glucose" Journal of the American Chemical Society, vol. 83, Jul. 5, 1961, pp. 2964-2965.

Rinehart, K. L., et al, "Chemistry of the Neomycins. IV. Isolation of Neosamines B and C. Stereochemistry of Neobiosamine C," Journal of the American Chemical Society, vol. 80, Dec. 5, 1958, pp. 6461-6462.

Rinehart, K. L., et al, "Chemistry of the Neomycins. VI. Structure of Neobiosamine B," Journal of the American Chemistry Society, vol. 82, Jun. 5, 1960, pp. 2970-2971.

Rodger, S.L., et al, "High Strength Cement Pastes," Journal of Materials Science, vol. 20, Aug. 1985, pp. 2853-2860.

Satoh, C., et al, "Studies on the Optical Rotatory Dispersion of Carbohydrate C-Nitroalcohols," Chemical & Pharmaceutical Bulletin, vol. 12, No. 4, 1964, pp. 518-520.

Sharples, A., "The Structure and behavior of reverse osmosis membranes," Chemical Engineer (Rugby, United Kingdom), vol. 1, No. 257, Jan. 1972, pp. 34-37.

Smirnov, P.M., "The transformation of nitrogen compounds in peat-ammonium and peat-mineral fertilizers and the efficacy of these fertilizers," Izvestiya Timiryazevskoi Sel'skokhozyaistvennoi Akademii, vol. 6, 1964, pp. 72-85. (No English translation available).

Smith, L.V., "Synthesis of 2,6-diamino-2,6-dideoxy-D-galactose," Dissertation, University of the Pacific, May 1965, 60 pages.

Smith, L.V., et al., "Amino sugar syntheses. X. Derivatives of benzyl 2-[(benzyloxycarbonyl)amino]-2- deoxy-3B1-Dgalactosiduronic acid and synthesis of 2,6-diamino-2,6-dideoxy-D-galactose," Justus Liebigs Annalen der Chemie, vol. 681, 1965, pp. 228-231. (No English translation available).

(56) References Cited

OTHER PUBLICATIONS

Suo, A., et al., "Synthesis and properties of carboxymethyl cellulose-graft-poly(acrylic acid-coacrylamide) as a novel cellulose-based superabsorbent," Journal of Applied Polymer Science, vol. 103, Issue 3, Feb. 5, 2007, pp. 1382-1388.
Tanasescu, I. et al., "Photochemical reactions in the derivatives of o-nitrobenzylidene acetals. XIX. o-Nitrobenzylidene-myoinositol," Acad. Rep. Populare Romine, Filiala Cluj, Studii Cercetari Chim., vol. 13, No. 1, 1962, pp. 69-75. (No English translation available).
Tsuji, K. et al., "Cobalt-60-irradiation as an alternate method for sterilization of penicillin G, neomycin, novobiocin, and dihydrostreptomycin," Journal of Pharmaceutical Sciences, vol. 72, No. 1, Jan. 1983, pp. 23-26.
Tsunakawa, M. et al., "Inosamycin, a complex of new aminoglycoside antibiotics. II. Structure determination," The Journal of Antibiotics, vol. 38, No. 10, pp. 1313-1321, 1985.
U.S. Environmental Protection Agency, "Chemical Summary for Acrylamide," prepared by Office of Pollution Prevention and Toxics, Sep. 1994, EPA 749-F-94-005a, 13 pages.
Usui, T. et al., "Synthesis of 3-O-acetyl-2,6-diazido-4-O-benzyl-2,6-dideoxy-L-idopyranosyl chloride, a glycosyl halide for the synthesis of neomycin B," Carbohydrate Research, vol. 130, 1984, pp. 165-177.
Valeriote, F.A., et al, "A Model for the Action of Vinblastine in Vivo," Biophysical Journal, vol. 6, 1966, pp. 145-152.
Wang, Y., et al., "Fabrication and characterization of a PAM modified PHBV/BG scaffold," Chinese Science Bulletin, vol. 54, No. 17, 2009, pp. 2940-2946.
Weidmann, H., et al., "Amino sugar syntheses. II. Benzyl 2,6-diamino-2,6-dideoxy-3B1-Dglucopyranoside," Justus Liebigs Annalen der Chemie, vol. 641, 1961, pp. 132-137. (No English translation available).
Weidmann, H., et al., "Amino sugar syntheses. III. Synthesis of 2,6-diamino-2,6-dideoxy-Dglucopyranose," Justus Liebigs Annalen der Chemie, vol. 641, 1961, pp. 138-142. (No English translation available).
Weidmann, H., et al., "Configuration of 2,6-diamino-2,6-dideoxyhexopyranose from neomycin C," Justus Liebigs Annalen der Chemie, vol. 644, 1961, pp. 127-129. (No English translation available).
Weidmann, H., et al., "Derivatives of 2-amino-2-deoxy-D-glucopyranose. III. 2-Amino-3,4,6-tri-O-benzoyl-2-deoxy-1-thio-3B2-Dglucopyranosides," Justus Liebigs Annalen der Chemie, vol. 628, No. 1/3, 1959, pp. 255-256. (No English translation available).
Weidmann, H., et al., "Synthesis of 2,6-diamino-2,6-dideoxy-D-glucose," Angewandte Chemie, vol. 72, 1960, pp. 750. (No English translation available).
Wolfrom, M. L., et al, "2,6-Diamino-2,6-dideoxy-D-mannose Dihydrochloride," Chemical Communications (London), vol. 8, 1965, pp. 143-144.
Wolfrom, M. L., et al, "Amino Derivatives of Starches. 2,6-Diamino-2,6-dideoxy-D-mannose Dihydrochloride," Journal of Organic Chemistry, vol. 30, No. 8, Aug. 1965, pp. 2728-2731.
Wolfrom, M. L., et al, "Methyl 2-Deoxy-2-sulfoamino-β-D-glucopyranoside Trisulfate and the Preparation of Tri-O-acetyl-2-amino-2-deoxy-(-D-glucopyranosyl Bromide," Journal of Organic Chemistry, vol. 26, Jun. 1961, pp. 2145-2146.
Wolfrom, M. L., et al, "Synthesis of Amino Sugars by Reduction of Hydrazine Derivatives; D- and L-Ribosamine, D-Lyxosamine," Journal of the American Chemical Society, vol. 81, Jul. 20,1959, pp. 3716-3719.
Yang, Y., et al., "Electrospun Composite Mats of Poly[(D,L-lactide)-co-glycolide] and Collagen with High Porosity as Potential Scaffolds for Skin Tissue Engineering," Macromolecular Materials and Engineering, vol. 294, No. 9, 2009, pp. 611-619.
Zaidi, S.A.H. et al., "The Preparation and estimation of iron saccharate," Pakistan Journal of scientific and Industrial Research, vol. 6, 1963, pp. 114-115.
Zhang, Y. et al., "Stimuli-responsive copolymers of n-isopropyl acrylamide with enhanced longevity in water for micro-and nanofluidics, drug delivery and non-woven applications," 2009, J. Mater. Chem. 19, pp. 4732-4739.
Bahulekar, R. et al., "Polyacrylamides containing sugar residues: synthesis, characterization and hepatocyte attachment studies," *Biotechnology Techniques*, Oct. 1998, vol. 12, No. 10, pp. 721-724.
Bahulekara et al., "Polyacrylamide containing sugar residues: synthesis, characterization and cell compatibility" *Carbohydrate Polymers*, 1998, vol. 37, No. 1, pp. 71-78, Fig. 1.
Chalker-Scott, Linda, "The Myth of Polyacrylamide Hydrogels: Polyacrylamide hydrogels are environmentally safe substances that reduce irrigation needs," 2 pp., downloaded May 9, 2013 from http://www.theinformedgardener.com.
CID11032184—Compound Summary, Pub Chem Compound, NCBI, downloaded Apr. 2, 2013 from http://pubchem.ncbi.nlm.nih.gov/summary/summary.cgi?cid=11032184&loc=ec_res, 4 pp.
Dust Control on Military Helipads, downloaded on Apr. 2, 2013 from http://www.midwestind.com/problems-we-solve/controlling-dust/dust-control-on-military-helipads.html.
International Search Report and Written Opinion for Intl. Pat. Appln. No. PCT/US2012/063240, mailed on Jan. 22, 2013, 9 pp.
Reti, Adrian R., et al., "Development of Urea-Based and Latex Emulsion Systems for Dust Control in Support of Military Operations," Jan. 1967, Pentagon Reports, Contract Report No. 3-172, Project No. 1-V-0-21701-A-046, Task 5, 70 pp.
Rushing, John F. et al., "Evaluation of Dust Palliatives for Unpaved Roads in Arid Climates," Aug. 2006, *J. Perf. Constr. Fac.*, pp. 281-286.
Storm Water Management Fact Sheet Dust Control, Environmental Protection Agency, Sep. 1999, EPA 832-F-99-003, 5 pp.
Tingle, J. S., et al., "Evaluation of Expedient Methods for Mitigating Dust on Helipads," Dust Abatement Project, 2004, Final Report, ERDC/GSL TR-04-XX U.S. Army Corps of Engineers, 89 pp.
United States Department of Agriculture, Grain Inspection, Packers and Stockyards Administration, "2008 Annual Report of the Federal Grain Inspection Service," 57 pp.
Yu, Kai, et al., "Synthesis of Functional Polymer Brushes Containing Carbohydrate Residues in the Pyranose Form and Their Specific and Nonspecific Interactions with Proteins," 2010, *Biomacromolecules*, vol. 11, pp. 3073-3085.
Aginsky Consulting Group, "Cosmetics Market Research Summary," Oct. 2007, pp. 1-8.

* cited by examiner

SOIL FIXATION, DUST SUPPRESSION AND WATER RETENTION

CROSS-REFERENCE TO RELATED APPLICATIONS

This U.S. patent application claims the benefit of priority to International Application No. PCT/US2012/063240, filed on Nov. 2, 2012, the entire contents of which are incorporated herein by reference in their entirety for any and all purposes.

FIELD

The present technology generally relates to retaining liquid, and, more particularly, to retaining a liquid on or in a soil-based substrate and/or debris disposed thereon using acrylamide pyranose polymers.

BACKGROUND

There are many problems and health safety issues when dust and/or debris is present in an environment such as construction and agricultural environments. As heavy machinery moves over unpaved roads and construction and agricultural sites, dust may be thrown into the atmosphere. Such dust may pose both health and economic risks to construction workers, farmers and others near these environments. Such risks may come from two sources, among others: suspended dust drying out the atmosphere around the site and from the inhalation of dust. The drying of the atmosphere from the suspended dust particles may lead to rapid dehydration of individuals, which can lead to heat stroke, sluggishness, hallucinations, and a variety of other physical and psychological ailments. Airborne crystalline silica that originates from the earth, concrete, masonry and rock on a site may become lodged in the membranes and/or lungs of the respiratory systems of the people on and near the site. Once there, they may harden and cause permanent damage and even death.

Economic risks may be a consequence of the health risks and from loss of productivity of the land. Dehydration may lead to loss in productivity. Workers may need more breaks to replenish fluids, may be less productive because they are uncomfortable, and may be less energetic, which leads to less work being accomplished per unit time. Longer term health issues may lead to loss of skilled workers and may increase the risk of lawsuits.

Additionally, dust may lead to loss of moisture from plants and animals. In turn, more water may be consumed in agricultural processes. Dust may also lead to loss of topsoils (e.g., soils which may contain the most minerals and nutrients for productive plant growth). Loss of water from soil may lead to crop failure and failure to retain water in the soil may lead to greater water consumption, as water may be needed to be constantly applied.

Previous solutions to these problems have included the constant application of water to sites using tanker trucks, fire hydrants and/or hoses. However, in such solutions, the water evaporates quickly, as it is not retained. This may lead to resumption of dust kick up into the atmosphere. Thus, water must be constantly applied. However, too much water at any given time may lead to muddy conditions. Oils have been used to suppress dust, but such oils are difficult to clean and are generally irreversible. Polymers and emulsions such as latex rubber and poly(vinyl acetate/vinyl alcohol) have been used as a fixation media but lack biodegradability and do not retain water. These polymers are generally used at a high concentration, and tend to bind soil, gravel and/or rocks together into large clumps. Under certain conditions (such in helicopter landing environments) large clumps of material may be thrown through the air, causing a safety hazard.

SUMMARY

In one aspect, a method is provided for retaining (at least temporarily) a liquid in a soil-based substrate. The methods may include applying an acrylamide pyranose polymer to a soil-based substrate. The methods may also include exposing the acrylamide pyranose polymer to the liquid.

In another aspects, a method is provided for at least temporarily retaining moisture in a soil-based substrate, the method includes applying an acrylamide pyranose polymer to the soil-based substrate. In any of the above embodiments, the acrylamide pyranose polymer comprises one or more of beads, pellets, chunks and particles. In some embodiments, the acrylamide pyranose polymer includes a solution of the acrylamide pyranose polymer. In some embodiments, the acrylamide pyranose polymer includes a suspension of the acrylamide pyranose polymer. In some embodiments, the acrylamide pyranose polymer includes a gel of the acrylamide pyranose polymer.

In any of the above embodiments, the applying may include one or more of spraying, dusting, atomizing and sprinkling the acrylamide pyranose polymer as a solid, solution, or suspension onto the soil-based substrate. In some embodiments, the applying may include mixing the acrylamide pyranose polymer into the soil-based substrate. In any of the above embodiments, the applying may include one or more of spraying, atomizing, flooding and sprinkling the liquid retention medium on top of the soil-based substrate.

In any of the above embodiments, the soil-based substrate includes one or more of a soil substrate, a topsoil substrate, a subsoil substrate, a potting soil substrate, a mud substrate, a clay substrate, a sand substrate, a gravel substrate, a rock substrate, a stone substrate, a concrete substrate, a cement substrate, and an asphalt substrate. In any of the above embodiments, the soil-based substrate may further include a surface, the surface having one or more of dust particles, saw dust particles, rock dust particles, silicate dust particles, organic particles, bacteria particles, mold particles, mildew particles, spore particles, dirt particles, soil particles, rock particles, stone particles, sand particles, asbestos particles, metal particles, fiber particles and insulation particles.

In any of the above embodiments, the acrylamide pyranose polymer includes a polymer having a repeat unit represented as:

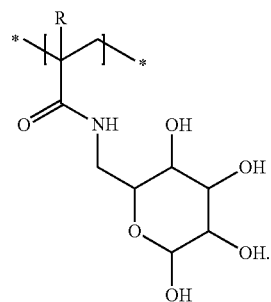

In the above structure, R is individually H or $C_1$-$C_8$ alkyl. In some embodiments, each R is individually H, methyl, ethyl, propyl, isopropyl, n-butyl, sec-butyl, tert-butyl, n-pentyl, n-hexyl, n-heptyl, n-octyl, 2-ethylhexyl, or isomers thereof.

In some embodiments, each R is individually H or methyl. In some embodiments, the acrylamide pyranose polymer is an acrylamide pyranose-acrylamide co-polymer or an acrylamide pyranose-(meth)acrylate co-polymer.

In another aspect, a kit is provided for at least temporarily retaining moisture in a soil-based substrate. The kits may include a container having an acrylamide pyranose polymer; and one or more instructions associated with the container, the one or more instructions including one or more directions for applying the acrylamide pyranose polymer to a soil-based substrate. In any of the kit embodiments, the acrylamide pyranose polymer may include one or more of beads, pellets, chunks and particles. In any of the kit embodiments, the container may be configured for spraying, dusting, atomizing or sprinkling of the acrylamide pyranose polymer as a solid, solution, or suspension onto the soil-based substrate. In any of the kit embodiments, the instructions may include directions for mixing the acrylamide pyranose polymer into the soil-based substrate.

In any of the kit embodiments, the acrylamide pyranose polymer may be a polymer represented as:

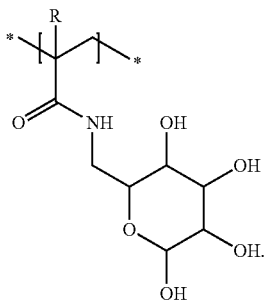

In the above structure, R is individually H or $C_1$-$C_8$ alkyl. In some embodiments, each R is individually H, methyl, ethyl, propyl, isopropyl, n-butyl, sec-butyl, tert-butyl, n-pentyl, n-hexyl, n-heptyl, n-octyl, 2-ethylhexyl, or isomers thereof. In some embodiments, each R is individually H or methyl. In any of the kit embodiments, the acrylamide-pyranose polymer may also include a repeat unit that includes a cross-linking moiety. In any of the kit embodiments, the acrylamide pyranose polymer may be an acrylamide pyranose-acrylamide co-polymer or an acrylamide pyranose-(meth)acrylate co-polymer. In any of the kit embodiments, the acrylamide pyranose polymer may be an acrylamide pyranose—meth(acrylate) co-polymer.

In some kit embodiments, the container includes a solution of the acrylamide pyranose polymer. In some kit embodiments, the container comprises a suspension of the acrylamide pyranose polymer. In some kit embodiments, the container comprises a gel of the acrylamide pyranose polymer.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
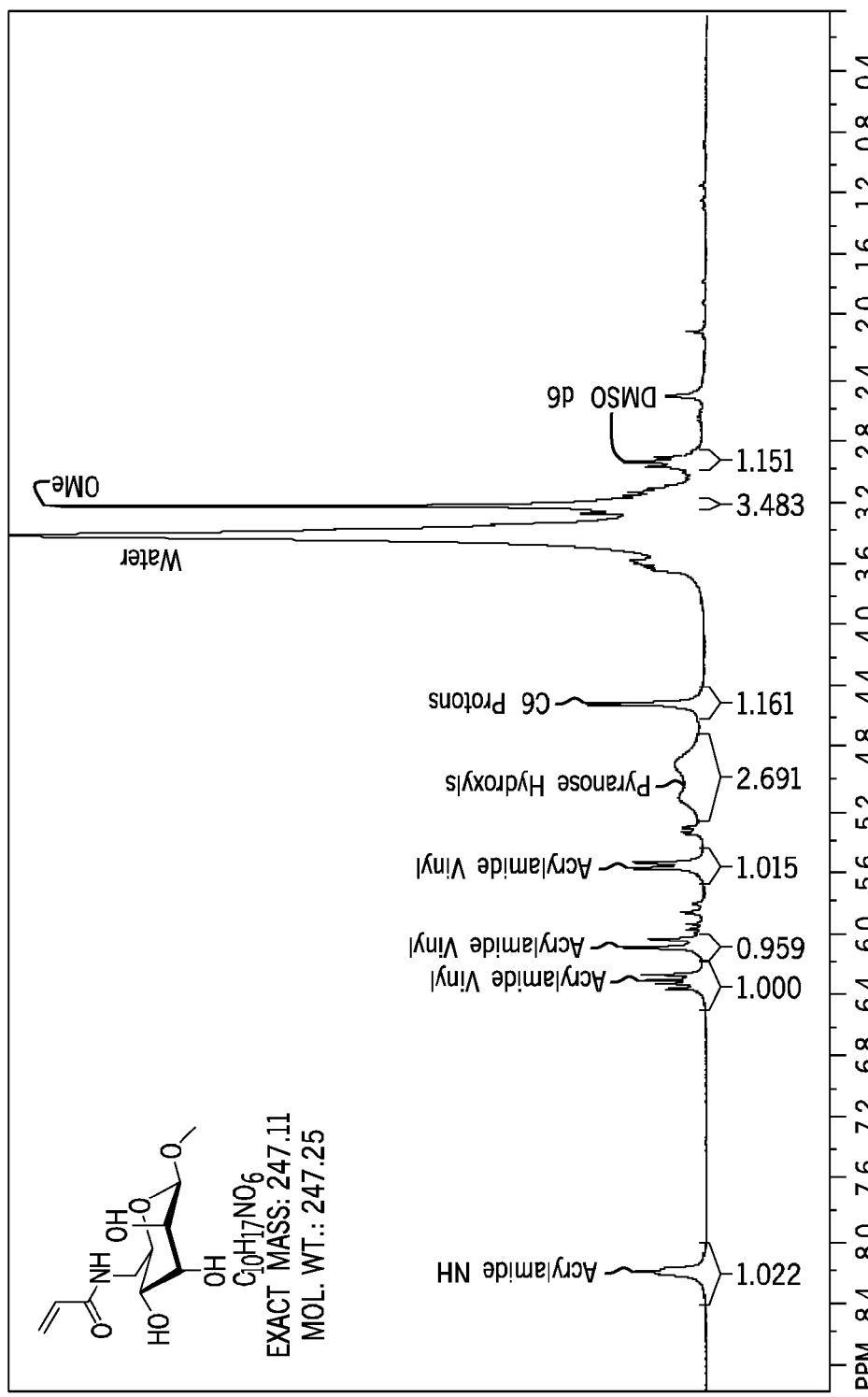
FIG. 1. 1H NMR of the N-(1-methyl-6-deoxy-D-glucose)-acrylamide.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Acrylamide pyranose polymers may be prepared by polymerization of the corresponding acrylamide pyranose monomers. Such polymers may be used on or in a soil-based substrate to retain moisture in the soil-based substrate and prevent, or mitigate, dusting of the substrate or debris associated with the substrate.

Acrylamide pyranose polymers are prepared, at least in part, from acrylamide pyranose monomers. Acrylamide pyranose monomers may be based upon various amino pyranoses, such as 6-(aminomethyl)tetrahydro-2H-pyran-2,3,4,5-tetraol (A) and 3-amino-6-(aminomethyl)tetrahydro-2H-pyran-2,4,5-triol (B).

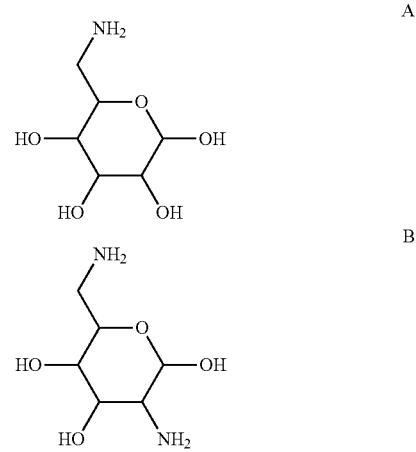

While related to methyl methacrylate and other acrylics, acrylamides are a different family and genus from other acrylates and generally have very different chemistries from acrylates. One difference between acrylamides from acrylates is that oxygen does generally not inhibit polymerization for the acrylamides, while oxygen generally strongly inhibits polymerization of acrylates. Another difference between acrylamides from acrylates is that the degradation products resulting from acrylamide are generally less acidic.

In general, the acrylamide pyranose monomers may be made by the coupling reaction between a pyranose amine and an acid chloride. The amine is on the pyranose unit and may be, optionally, protected as the hydrochloride. The acid chloride is a polymerizable functional unit such as acrylchloride. The process is generally shown in Scheme 1.

Scheme 1:

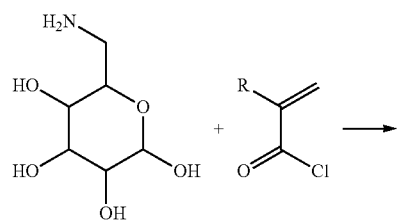

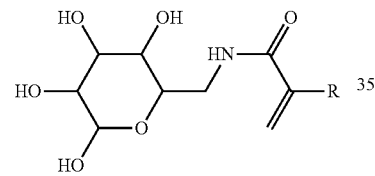

There is generally no need to protect the hydroxyl units on the pyran ring, as the amino moieties are generally much more reactive than hydroxyl moieties. As such, the amino moieties may couple with the amino exclusively. Hydroxy moieties may react only by the use of improper techniques such as a using a large amount of acid chloride.

In Scheme 1, each R is individually H or $C_1$-$C_8$ alkyl. Illustrative $C_1$-$C_6$ alkyl groups include, but are not limited to, methyl, ethyl, propyl, isopropyl, n-butyl, sec-butyl, tert-butyl, n-pentyl, n-hexyl, n-heptyl, n-octyl, and 2-ethylhexyl, and isomers thereof.

Other methods of preparing acrylamide pyranose polymers include reacting acrylic acid with an amino pyranose and heating the resulting salt, reacting (meth)acrylic anhydride with aminopyranose, and reacting a (meth)acrylate ester and performing a catalytic transesterification reaction with the aminopyranose. Illustrative transesterification catalysts may include, but are not limited to, organotin, organoziconium, and organotitanium compounds.

The cross-linked acrylamide pyranose polymers may also be prepared, at least in part, by the inclusion of multifunctional pyranose monomers, or multifunctional pyranose monomers as cross-linking agents. For example, a multi-functional pyranose monomer may be prepared from 2,6-diamino-2,6-dideoxy-D-glucose and a (meth)acrylic chloride. See Scheme 2.

Scheme 2:

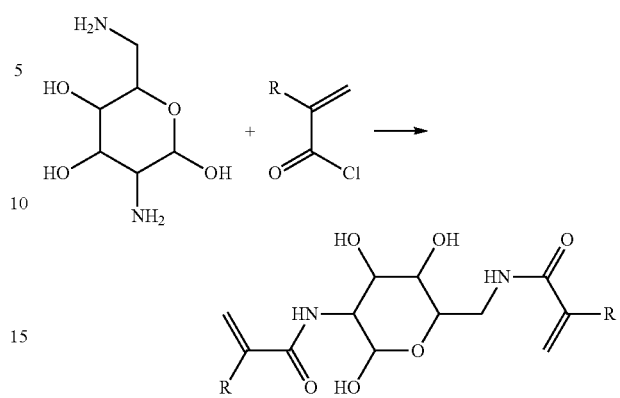

In Scheme 2, each R is individually H or $C_1$-$C_8$ alkyl. Illustrative $C_1$-$C_6$ alkyl groups include, but are not limited to, methyl, ethyl, propyl, isopropyl, n-butyl, sec-butyl, tert-butyl, n-pentyl, n-hexyl, n-heptyl, n-octyl, and 2-ethylhexyl, and isomers thereof. The multi-functional monomer may be included in the polymerization process of the acrylamide pyranose monomer to provide cross-linking in the polymer. Additional cross-linking monomers will result in a higher cross-linking density in the polymer.

Polymers prepared from the above monomers include the polymerization product of the action of the acrylamide functionality. For example, the —C(O)C(CH$_2$)R groups polymerize through C=CH$_2$ moiety to form polymers having the following general structure:

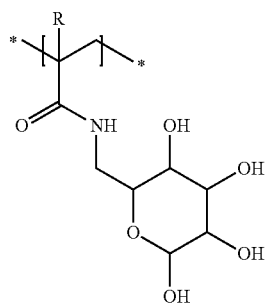

As introduced above, the acrylamide-pyranose polymer may be cross-linked. This may be accomplished by introducing a cross-linking monomer, as described above, during the polymerization. The cross-linked acrylamide-pyranose polymer may be a polymer represented with the following repeat units:

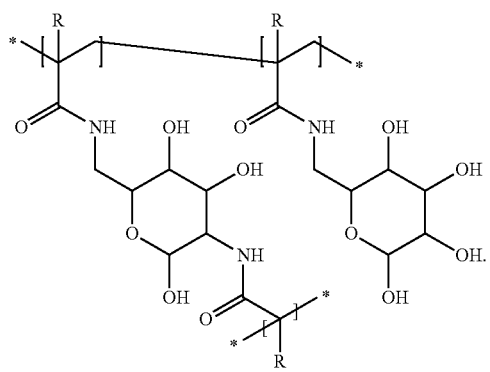

The structure of amino pyranose has multiple possible stereo isomers according to the type. Some common structures of the root may be amino-D-glucose, amino-D-mannose, and amino-galactose. These amino pyranoses may be mono for thermoplastics or bis for thermosetting resins. The amino moieties are not limited to any particular positions. For example, the amino moieties may be cis to each other, meta to each, or para to each other.

The pyranose monomers may also be mixed with other (meth)acrylate or (meth)acrylamide monomers to provide acrylamide pyranose-(meth)acrylate or acrylamide pyranose-(meth)acrylamide polymers. As used herein, the prefix (meth) in a general reference refers the acrylate and/or the methacrylate compound, accordingly, the (meth) is optional. Illustrative (meth)acrylates and (meth)acrylamides include, but are not limited to acrylamide, methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, sec-butyl methacrylate, tert-butyl methacrylate, 2-ethylbutyl methacrylate, cinnamyl methacrylate, cyclohexyl methacrylate, cyclopentyl methacrylate, 2-ethoxyethyl methacrylate, furfuryl methacrylate, 3-methoxybutyl methacrylate, 2-methoxybutyl methacrylate, n-octyl-methacrylate, 2-ethylhexyl methacrylate, methyl acrylate, ethyl acrylate, n-propyl acrylate, n-butyl acrylate, isopropyl acrylate, isobutyl acrylate, n-amyl acrylate, n-hexyl acrylate, isoamyl acrylate, 2-hydroxyethyl acrylate, 2-hydroxypropyl acrylate, sec-butyl acrylate, tert-butyl acrylate, 2-ethylbutyl acrylate, cinnamyl acrylate, cyclohexyl acrylate, cyclopentyl acrylate, 2-ethoxyethyl acrylate, furfuryl acrylate, 3-oxybutyl acrylate, 2-oxybutyl acrylate, n-octyl-acrylate, and 2-ethylhexyl acrylate.

The pyranose polymers described above are hygroscopic materials that may imbibe a large amount of moisture. Accordingly, such polymers may be sprayed on, or mixed with, soil-based substrates thereby retaining moisture with the soil and preventing, or at least minimizing dusting of the substrate. Methods of preventing or minimizing the loss of soil or blowing of soil dust include applying the acrylamide pyranose polymers to the soil-based substrate as solution or as a particle. The acrylamide pyranose polymer may be applied in the presence of water to not only swell and absorb into the polymer, but the water also reduces the amount of dusting of the soil-based substrate. Alternatively, the acrylamide pyranose polymer may be mixed with the soil or applied to the soil as a solid with the subsequent introduction of the water to the soil-based substrate and the polymer.

In some embodiments, the acrylamide pyranose polymer may be applied to the soil-based substrate as a liquid-based solution, a gel-based solution, beads, pellets, chunks and/or particles. In some, the acrylamide pyranose polymer may be applied on top of the soil-based substrate, or intimately mixed with the soil-based substrate.

Other additives may also be used in addition to the acrylamide pyranose polymers. Illustrative additives may include buffers to adjust pH to the specific soil conditions in which the product may be used, and/or ionic additives (e.g., calcium, sodium, potassium, chloride) to adjust ionic strength of the liquid retention medium to match that of soil conditions used form $10^{-6}$ M to 1 M. Other illustrative additives may include, but are not limited to, surfactants, colorants, insecticides and/or herbicides. Such additives may be included with the polymer from 0.001 wt % to about 50 wt %. In some embodiments, the additional additive(s) may be individually present from about 0.01 wt % to about 10 wt %.

Where the acrylamide pyranose polymer is added to the soil-based substrate with the water, the acrylamide pyranose polymer-water solution or suspension may be applied by spraying, dusting, atomizing, sprinkling or flooding on top of the soil-based substrate.

Some examples generally depict acrylamide pyranose polymer use as a superior water retention agent in soils and/or dust suppressant. The design and synthesis of acrylamide pyranose monomers and polymers may provide greater productivity, health and dust suppression, and may lead to lessened water waste and consumption. The acrylamide pyranose polymers may be environmentally benign, non-toxic, and may degrade with time and exposure. Degradation products may be environmentally benign, non-toxic, extreme in neither acidity nor basicity, and may provide growing life with nourishment.

While the soil-based substrates and/or aggregates may include soil, topsoil, subsoil, potting soil, mud, clay, sand, gravel, rock, stone, concrete, cement and/or asphalt, the soil-based substrate and/or aggregates shall not be limited to such examples. Soil-based substrate and/or aggregates may include any earthen material having organic and/or inorganic media or a mixture of organic and/or inorganic media in solid, liquid and/or gaseous form. In some examples, the soil-based substrate and/or aggregates may include a surface. Such surface may include debris and/or particles disposed thereon. Example particles may include particles of dust, saw dust, rock dust, silicate dust, organic particulates, dirt, bacteria, mold, mildew, spores, soil, rock, stone, sand, asbestos, and metal.

In some examples, the acrylamide pyranose polymer particles may be about 10 μm to about 100 μm in size (e.g., diameter, width, height and/or depth). In some examples, the acrylamide pyranose polymer solution may be about 0.001% mass of acrylamide pyranose polymer in solution (e.g., water) to about 80% mass of acrylamide pyranose polymer in solution (e.g., water).

The acrylamide pyranose polymers exhibit excellent liquid retention properties. In some examples, when water is applied to a dust-prone area with acrylamide pyranose polymers, the acrylamide pyranose polymers may absorb the water and swell. Such acrylamide pyranose polymers may then slowly release the water, thereby suppressing dust. This, in turn, may facilitate keeping plants hydrated, keeping workers comfortable and safe, and greatly decreasing water usage and requirements.

Poly(acrylamide) is listed as a non-toxic substance; however, its monomer(acrylamide) is listed as a carcinogen. Thus, there is going concern about the use of poly(acrylamide) due to the carcinogenic nature of its monomer. These concerns extend to industries such as agriculture and construction where poly(acrylamide) is used, as there is a possibility that acrylamide monomer may be liberated from the polymer. The acrylamide pyranose described herein addresses such problems. Hydrolysis of the acrylamide pyranose structure may yield the amino pyranose structure and not acrylamide. Thus, the carcinogen source is removed. Therefore, the acrylamide pyranose polymer may remove the problems associated with acrylamide. In doing so, the acrylamide pyranose polymer may facilitate keeping soil moist for long time periods, providing long term dust suppression, providing a biodegradable non-toxic, non-carcinogenic solution. Further, pyranose moieties do not coordinate metal ions, have an affinity for water (even with ions present), provide a nitrogen fixation source, and provide an energy source to microbes and plant life in soil. Further, the acrylamide pyranose polymer may be compatible with existing biological and monomer/polymer systems such that various polymers, copolymers, graft copolymers, and/or block copolymers may be formed and used as particles, chunks, solutions and the like. Even further, the acrylamide pyranose polymer may form hydrogels upon exposure to water, thus lessening water waste and evaporation.

The present invention, thus generally described, will be understood more readily by reference to the following examples, which are provided by way of illustration and are not intended to be limiting of the present invention.

EXAMPLES

Example 1

Synthesis of N-(1-methyl-6-deoxy-D-glucose)-acrylamide. To a 1 L beaker was added 100 mL of deionized water. To the deionized water was added 11.000 g (103.790 mmol) of sodium carbonate. The sodium carbonate was allowed to dissolve into the water which took approximately an hour and a half. Once the sodium carbonate dissolved the beaker was placed into an ice bath and cooled to 0-2° C. To the cooled acetone/pyridine solution was added 11.000 g (40.130 mmol) of 1-methyl-6-deoxy-6-ammonium bromide-D-glucose and the compound was allowed to dissolve with very slow stirring. To a separate 250 mL beaker was added 100 mL hexanes. To the hexanes was added 3.65 mL of acryloyl chloride and the two mixed together. This solution was added dropwise to the water solution to generate a biphasic system. This biphasic reaction system was stirred slowly overnight. The contents of the beaker were then poured into a separatory funnel, the layers allowed to separate, and the water layer was added to a round bottom flask. The water was then removed using rotary evaporation. Acetone was added to the solid contents and then rotary evaporated. Ethanol was added to the solid material, dissolving the organics while the inorganic materials did not dissolve. The ethanol was filtered to remove the insoluble inorganic materials followed by removal of the ethanol by rotary evaporation. The solid contents were then recrystallized from methanol/acetone to yield 12.987 g of material or 131% of the theoretical yield. The reason for the excess is due to leftover water and bromide in the material. The 1H NMR of the N-(1-methyl-6-deoxy-D-glucose)-acrylamide product is shown in FIG. 1.

Example 2

Figure 2:
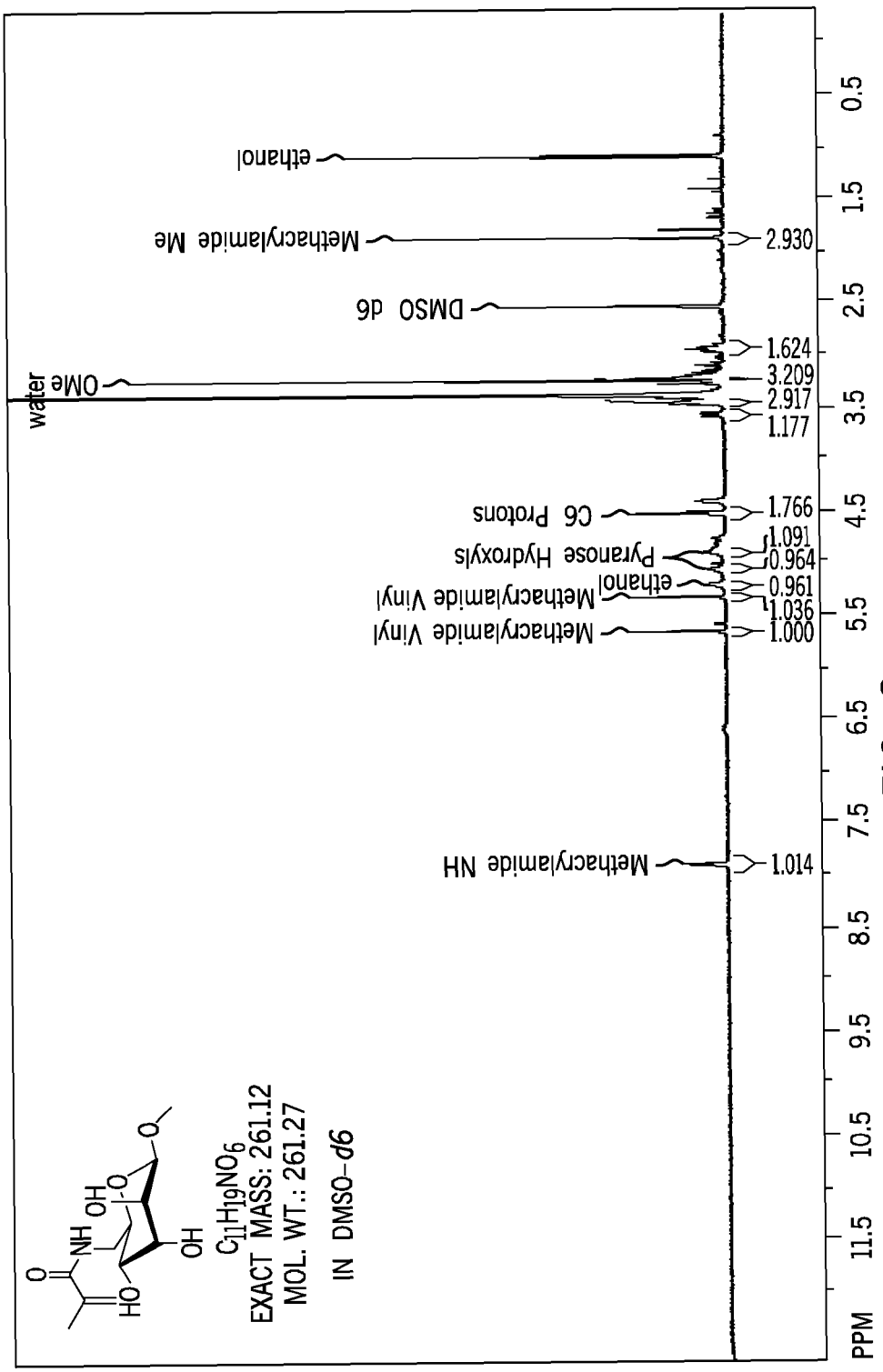
FIG. 2. 1H NMR of the N-(1-methyl-6-deoxy-D-glucose)-methacrylamide.

Synthesis of N-(1-methyl-6-deoxy-D-glucose)-methacrylamide. To a 1 L beaker was added 100 mL of deionized water. To the deionized water was added 11.000 g (103.790 mmol) of sodium carbonate. The sodium carbonate was allowed to dissolve into the water which took approximately an hour and a half. Once the sodium carbonate dissolved the beaker was placed into an ice bath and cooled to 0-2° C. To the cooled acetone/pyridine solution was added 11.000 g (40.130 mmol) of 1-methyl-6-deoxy-6-ammonium bromide-D-glucose and allowed to dissolve with very slow stirring. To a separate 250 mL beaker was added 100 mL hexanes. To the hexanes was added 4.05 mL of methacryloyl chloride and the two mixed together. This solution was added dropwise to the water solution to generate a biphasic system. This biphasic reaction system was stirred slowly overnight. The contents of the beaker were then poured into a separatory funnel, the layers allowed to separate, and the water layer was added to a round bottom flask. The water was then removed using rotary evaporation. Acetone was added to the solid contents and then rotary evaporated. Ethanol was added to the solid material, dissolving the organics while the inorganic materials did not dissolve. The ethanol was filtered to remove the insoluble inorganic materials followed by removal of the ethanol by rotary evaporation. The solid contents were then recrystallized from ethanol/acetone to yield 14.721 g of material or 141% of the theoretical yield. The reason for the excess is due to leftover water and bromide in the material. The 1H NMR of the N-(1-methyl-6-deoxy-D-glucose)-methacrylamide is shown in FIG. 2. The compound was placed under vacuum on dry ice overnight to help remove the remaining water and ethanol from the recrystallization.

Example 3

Synthesis of N-(3,4,5,6-tetrahydroxy-tetrahydro-pyran-2-ylmethyl)-acrylamide. N-(6-deoxy-D-galactose)-acrylamide may be synthesized by means of acid chloride coupling mediated by an organic base. Anhydrous THF (500 mL) may be added to a flame dried 1 L three neck flask and flooded with argon. To a flask containing THF (500 ml) is added anhydrous 6-amino-6-deoxy-D-galactose hydrochloride (30 g) and anhydrous pyridine (15.6 g) at −20° C. Acrylchloride (13.1 g) in THF (50 ml) is then added dropwise, followed by warming to room temperature. The reaction is allowed to proceed for five hours at 25° C. The pyridinium chloride precipitate is removed by filtration followed by washing with additional THF. The solvents are then removed under vacuum to yield N-(6-deoxy-D-galactose)-acrylamide.

Example 4

Synthesis of N-(6-deoxy-D-galactose)-methacrylamide. Following the procedure of Example 2, 1,6-amino-6-deoxy-D-glucose may be reacted with methacrylic chloride to yield N-(6-deoxy-D-galactose)-methacrylamide.

Example 5

Synthesis of N-(6-deoxy-D-galactose)-acrylamide. Following the procedure of Example 3, pyridine may be replaced with potassium carbonate to yield N-(6-deoxy-D-galactose)-acrylamide.

Example 6

Synthesis of N-(3,4,5,6-tetrahydroxy-tetrahydro-pyran-2-ylmethyl)-acrylamide by use of a biphasic system. N-(6-deoxy-D-galactose)-acrylamide is synthesized by means of acid chloride coupling. Anhydrous THF (500 mL) is added to a flame dried, 1 L, three neck flask under argon. Anhydrous 6-amino-6-deoxy-D-galactose hydrochloride (30 g) is added to water (150 ml), and the solution is neutralized with NaOH (3.4 g). An acrylchloride (13.1 g) solution in $CH_2Cl_2$ (100 ml) is added to the 6-amino-6-deoxy-D-galactose water solution at room temperature and stirred rapidly to form an emulsion. A 1 M NaOH solution is added to the reaction drop wise to maintain the pH above 7. The reaction is then allowed to proceed for five hours at 25° C. After phase separation, the organic layer is separated and the water layer washed with three 25 mL portions of methylene chloride. The combined organic solutions are combined, dried, and the solvent removed to yield N-(6-deoxy-D-galactose)-acrylamide.

Example 7

Synthesis of 2-methyl-N-[3,4,6-trihydroxy-5-(2-methyl-acryloylamino)-tetrahydro-pyran-2-ylmethyl]-acrylamide. Anhydrous THF (500 mL) is added to a flame dried 1 L three neck flask and flooded with argon. To the THF is added 2,6-diamino-2,6-dideoxy-D-glucose hydrochloride (38.6 g) and pyridine (32.5 g) to dissolve. Methacrylic chloride (33.2 g) in 55 mL of dry THF is then added to the 2,6-diamino-2,6-dideoxy-D-galactose solution at −20° C. followed by warming to room temperature. The reaction is allowed to proceed for five hours at room temperature. The pyridinium chloride is removed by filtration. After washing of the pyridinium chloride with THF, the collected organic fractions are subjected to solvent to yield N,N-(2,6-deoxy-D-glucose)-2,6-acrylamide.

Example 8

Synthesis of N,N-(2,6-deoxy-D-galactose)-2,6-acrylamide. Using a similar procedure as outlined in Example 1, 2,6-diamino-2,6-dideoxy-D-galactose is reacted with acrylchloride to yield N,N-(2,6-deoxy-D-galactose)-2,6-acrylamide.

Example 9

Synthesis of N,N-(2,6-deoxy-D-glucose)-2,6-acrylamide. Using a similar procedure as outlined in Example 3, pyridine is replaced with 412 mmol of potassium carbonate to yield N,N-(2,6-deoxy-D-glucose)-2,6-acrylamide.

Example 10

Synthesis of acrylamide pyranose polymers via free radical polymerization. Polymers of acrylamide pyranose may be made by free radical polymerization using a thermal initiator. Polymerization may be either in bulk using AIBN or as a 30% water solution using ammonium persulfate. Bulk polymerization may be forced through extruders at partial polymerization and may be cut into pellets, or the solid polymer may be crushed into chunks. Bead polymerization in vegetable oil may lead to beads that may be tuned to the desired size.

Example 11

Potting soil using acrylamide pyranose chunks. Soil (40 gallons), alfalfa meal (4 cups), bone meal (4 cups), kelp meal (4 cups), dolomite lime (4 cups), earthworm casting (30 pounds), Greensand (4 cups), rock phosphate (4 cups), diatomaceous earth (4 cups), and poly(N-(6-deoxy-D-galactose)-acrylamide cross-linked with 0.5% N,N-(2,6-deoxy-D-glucose)-2,6-acrylamide) (0.1 mm to 8 mm average size, 6 pounds) are mixed to form a potting soil. The potting soil is ready to use for house plants, gardens, garden starter plants, and other growing needs.

Example 12

Dust suppressant as beads/chunks. Poly(N-(6-deoxy-D-galactose)-acrylamide cross-linked with 0.5% N,N-(2,6-deoxy-D-glucose)-2,6-acrylamide) (0.1 mm to 10 mm beads/chunks) form may be applied (e.g., sprinkled) substantially uniformly to the ground by hand or use of a disperser that is either manual or powered. Density of coverage may be 250 g of chunks/beads/particles per square meter of soil. Water is then applied to the sprinkled beads/chunks, which may then absorb the water and hold it to the soil-based substrate.

Example 13

Dust suppressant as beads. Poly(N-(6-deoxy-D-galactose)-acrylamide cross-linked with 0.5% N,N-(2,6-deoxy-D-glucose)-2,6-acrylamide) (20 μm-100 μm beads) is applied (e.g., sprinkled) substantially uniformly to the ground by hand or use of a disperser that may be either manual or powered. The density of the coverage may be on the order of about 100 g of beads per square meter of soil. Water is then applied to the sprinkled beads.

Example 14

Dust suppressant as a solution. Poly(N-(6-deoxy-D-galactose)-acrylamide, weight average molecular weight ($M_w$) 76,000 g/mol) as a dilute (10% by wt. polymer) water solution may be applied to the ground by means of a sprinkler system, hose, or water truck.

Example 15

Dust suppressant as a solution. Poly(N-(6-deoxy-D-galactose)-acrylamide; $M_w$ 76,000 g/mol) may be added to water to form a dilute water solution (5% by wt. polymer). To 20 gallons of this solution is added 12 fluid oz. of pH 7.0 buffer solution, 0.031 g of calcium carbonate, and 0.046 g of sodium bicarbonate. This solution may be applied to the ground by means of a sprinkler system, hose, or water truck.

Example 16

Comparison of the dust suppressant solution of Example 13 with water as dust suppressant. To 20 gallons of water is added 12 fluid oz. of pH 7.0 buffer solution, 0.031 g of calcium carbonate, and 0.046 g of sodium bicarbonate to form a comparative dust suppressant solution. The Example 15 solution is applied to a patch of topsoil by means of a hose, while the comparative solution is applied to a separate patch of topsoil by means of a hose. A fan is placed adjacent and at equal distance to each patch of topsoil to continuously move air over the respective patches. Over 24 hours, the patch of topsoil treated with the Example 15 solution is expected to produce less dust and retain more moisture than the patch of topsoil treated with the comparative solution.

Example 17

Dust suppressant as a solution. Poly(N-(6-deoxy-D-galactose)-acrylamide; $M_w$ 76,000 g/mol) may be added to water to form a dilute water solution (5% by wt. polymer). To 20 gallons of this solution is added 240 fluid oz. of pH 7.0 buffer solution, 0.620 g of calcium carbonate, and 0.920 g of sodium bicarbonate. This solution may be applied to the ground by means of a sprinkler system, hose, or water truck.

Example 18

Comparison of the dust suppressant solution of Example 13 with water as dust suppressant. To 20 gallons of water is added 240 fluid oz. of pH 7.0 buffer solution, 0.620 g of calcium carbonate, and 0.920 g of sodium bicarbonate to form a comparative dust suppressant solution. The Example 17 solution is applied to a patch of topsoil by means of a hose, while the comparative solution is applied to a separate patch of topsoil by means of a hose. A fan is placed adjacent and at equal distance to each patch of topsoil to continuously move air over the respective patches. Over 24 hours, the patch of topsoil treated with the Example 17 solution is expected to produce less dust and retain more moisture than the patch of topsoil treated with the comparative solution.

Example 19

Dust suppressant as a solution. Poly(N-(6-deoxy-D-galactose)-acrylamide; $M_W$ 76,000 g/mol) may be added to water to form a dilute water solution (5% by wt. polymer). To 20 gallons of this solution is added 240 fluid oz. of pH 7.0 buffer solution, 3.100 g of calcium carbonate, and 4.600 g of sodium bicarbonate. This solution may be applied to the ground by means of a sprinkler system, hose, or water truck.

Example 20

Comparison of the dust suppressant solution of Example 13 with water as dust suppressant. To 20 gallons of water is added 240 fluid oz. of pH 7.0 buffer solution, 0.620 g of calcium carbonate, and 0.920 g of sodium bicarbonate to form a comparative dust suppressant solution. The Example 19 solution is applied to a patch of topsoil by means of a hose, while the comparative solution is applied to a separate patch of topsoil by means of a hose. A fan is placed adjacent and at equal distance to each patch of topsoil to continuously move air over the respective patches. Over 24 hours, the patch of topsoil treated with the Example 19 solution is expected to produce less dust and retain more moisture than the patch of topsoil treated with the comparative solution.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms “comprising,” “including,” “containing,” etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase “consisting essentially of” will be understood to include those elements specifically recited and those additional elements that do not materially affect the basic and novel characteristics of the claimed technology. The phrase “consisting of” excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as “up to,” “at least,” “greater than,” “less than,” and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A method for at least temporarily retaining moisture in a soil-based substrate, the method comprising applying an acrylamide pyranose polymer to the soil-based substrate;

wherein the acrylamide pyranose polymer comprises repeat units represented as:

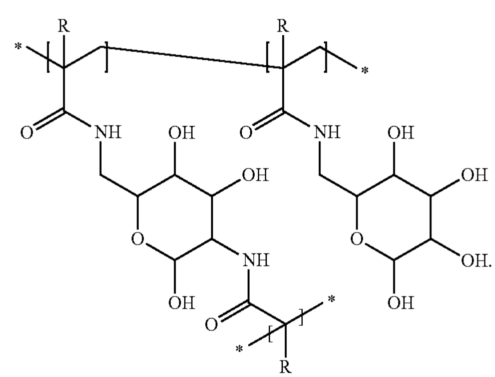

wherein each R is individually H or $C_1$-$C_8$ alkyl.

2. The method of claim 1, wherein the applying comprises applying one or more of beads, pellets, chunks and particles comprising the acrylamide pyranose polymer.

3. The method of claim 2, wherein the particles are a size of about 10 μm to about 100 μm.

4. The method of claim 1, wherein the applying comprises one or more of spraying, dusting, atomizing and sprinkling a solid, solution, or suspension comprising the acrylamide pyranose polymer onto the soil-based substrate.

5. The method of claim 1, wherein the applying comprises mixing the acrylamide pyranose polymer into the soil-based substrate.

6. The method of claim 1, wherein the acrylamide pyranose polymer is in a solution, a suspension, or a gel.

7. The method of claim 6, wherein the solution of the acrylamide pyranose polymer comprises about 0.001% to about 90% by mass of the acrylamide pyranose polymer.

8. The method of claim 1, wherein the soil-based substrate comprises one or more of a soil substrate, a topsoil substrate, a subsoil substrate, a potting soil substrate, a mud substrate, a clay substrate, a sand substrate, a gravel substrate, a rock substrate, a stone substrate, a concrete substrate, a cement substrate, and an asphalt substrate.

9. The method of claim 1, wherein each R is individually H or methyl.

10. The method of claim 1, wherein each R is individually H, methyl, ethyl, propyl, isopropyl, n-butyl, sec-butyl, tert-butyl, n-pentyl, n-hexyl, n-heptyl, n-octyl, 2-ethylhexyl, or isomers thereof.

11. The method of claim 1, wherein the acrylamide pyranose polymer further comprises a monomer that is an acrylamide or a (meth)acrylate.

12. The method of claim 11, wherein the monomer is selected from acrylamide, methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, sec-butyl methacrylate, tert-butyl methacrylate, 2-ethylbutyl methacrylate, cinnamyl methacrylate, cyclohexyl methacrylate, cyclopentyl methacrylate, 2-ethoxyethyl methacrylate, furfuryl methacrylate, 3-methoxybutyl methacrylate, 2-methoxybutyl methacrylate, n-octyl-methacrylate, 2-ethylhexyl methacrylate, methyl acrylate, ethyl acrylate, n-propyl acrylate, n-butyl acrylate, isopropyl acrylate, isobutyl acrylate, n-amyl acrylate, n-hexyl acrylate, isoamyl acrylate, 2-hydroxyethyl acrylate, 2-hydroxypropyl acrylate, sec-butyl acrylate, tert-butyl acrylate, 2-ethylbutyl acrylate, cinnamyl acrylate, cyclohexyl acrylate, cyclopentyl acrylate, 2-ethoxyethyl acrylate, furfuryl acrylate, 3-oxybutyl acrylate, 2-oxybutyl acrylate, n-octyl-acrylate, or 2-ethylhexyl acrylate.

13. The method of claim 1, wherein applying the acrylamide pyranose polymer occurs in the presence of water.

14. The method of claim 1, wherein the method further comprises applying an additive to the soil-based substrate.

15. The method of claim 14, wherein the additive is about 0.0001 wt % to about 50 wt % of the combined weight of the acrylamide pyranose polymer and the additive.

16. The method of claim 14, wherein the additive comprises a buffer, an ionic additive, a surfactant, a colorant, an insecticide, a herbicide, or combinations of any two or more thereof.

17. The method of claim 16, wherein the additive is about 0.0001 wt % to about 50 wt % of the combined weight of the acrylamide pyranose polymer and the additive.

18. A method for at least temporarily retaining moisture in a soil-based substrate, the method comprising applying an acrylamide pyranose polymer to the soil-based substrate;
wherein the acrylamide pyranose polymer comprises at least one repeat unit derived from N-(6-deoxy-D-galactose)-acrylamide, N-(6-deoxy-D-galactose)-methacrylamide, N-(1-methyl-6-deoxy-D-glucose)-acrylamide, or N-(1-methyl-6-deoxy-D-glucose)-methacrylamide, and at least one repeat unit derived from N,N-(2,6-deoxy-D-glucose)-2,6-acrylamide.

* * * * *